Nov. 7, 1933.   J. GUTHRIE   1,933,624
APPARATUS FOR CLEANING CONDUITS AND STRINGING CABLES THERETHROUGH
Filed Nov. 6, 1931   3 Sheets-Sheet 1
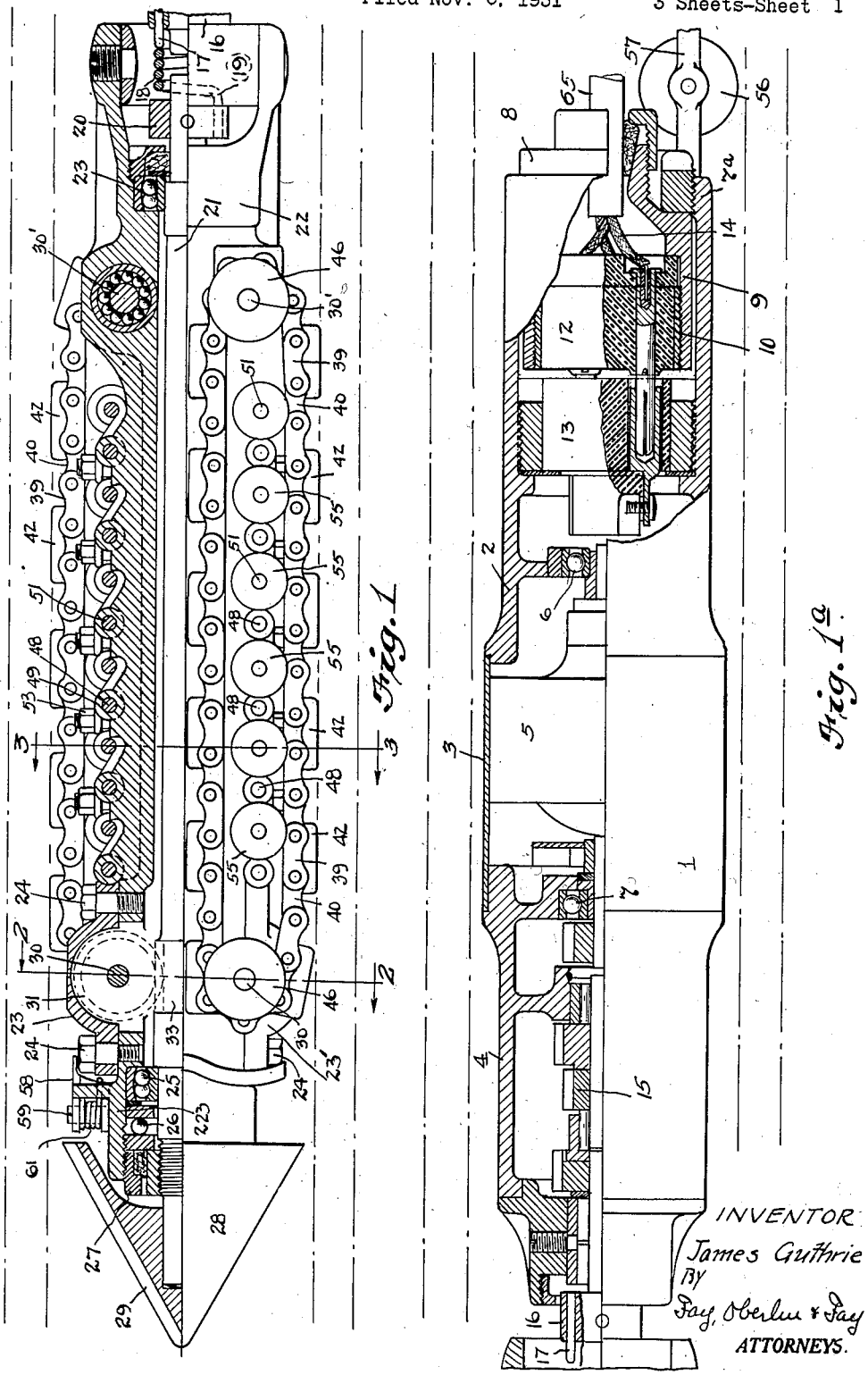
INVENTOR
James Guthrie
BY
Fay, Oberlin & Fay
ATTORNEYS.

Nov. 7, 1933.  J. GUTHRIE  1,933,624
APPARATUS FOR CLEANING CONDUITS AND STRINGING CABLES THERETHROUGH
Filed Nov. 6, 1931  3 Sheets-Sheet 2
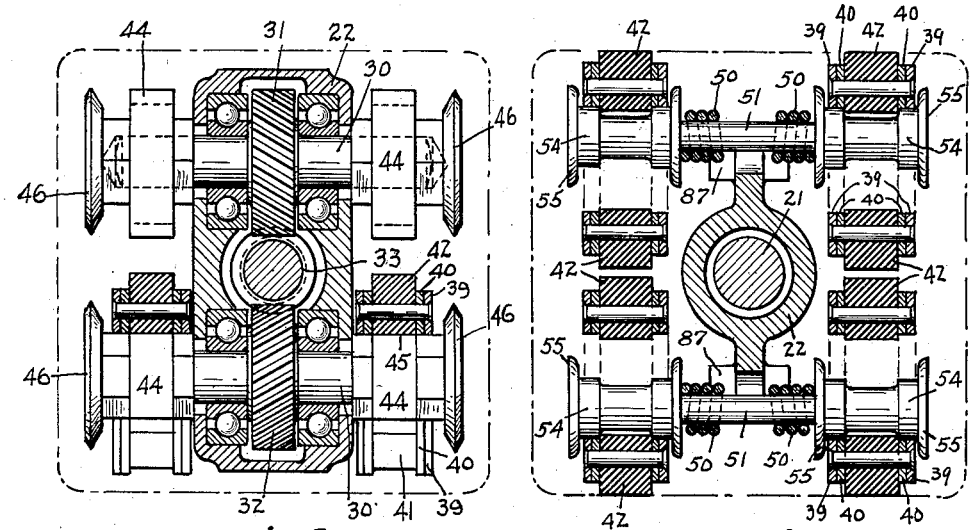
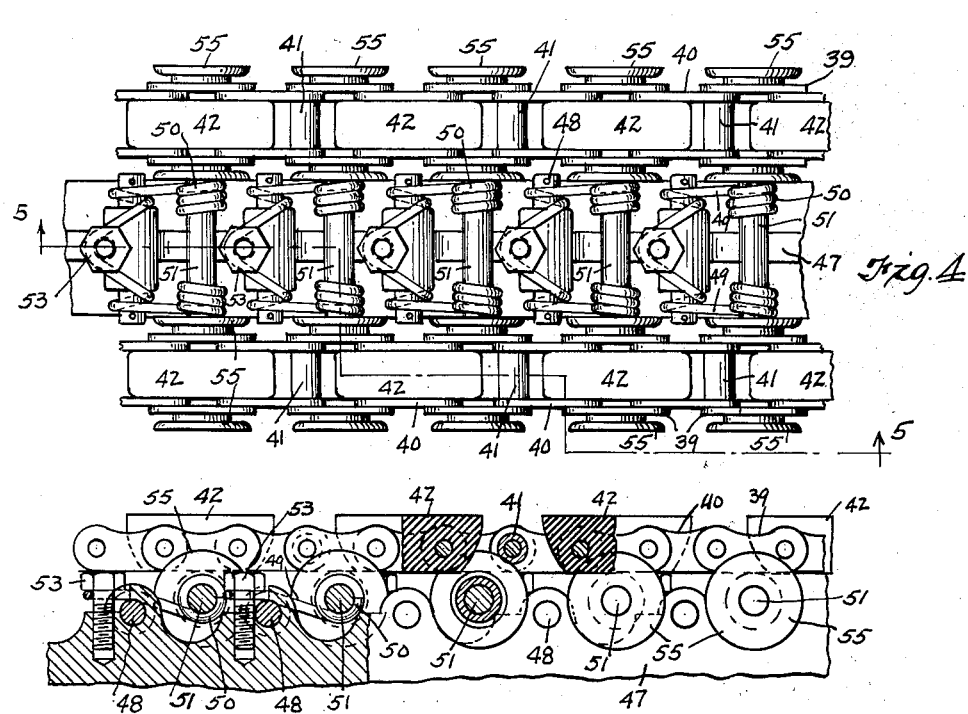
INVENTOR.
James Guthrie
BY
Fay, Oberlin & Fay
ATTORNEYS.

Nov. 7, 1933.  J. GUTHRIE  1,933,624
APPARATUS FOR CLEANING CONDUITS AND STRINGING CABLES THERETHROUGH
Filed Nov. 6, 1931  3 Sheets-Sheet 3

INVENTOR.
James Guthrie
BY
Fay. Oberlin + Fay
ATTORNEYS.

Patented Nov. 7, 1933

1,933,624

UNITED STATES PATENT OFFICE 1,933,624

APPARATUS FOR CLEANING CONDUITS AND STRINGING CABLES THERETHROUGH

James Guthrie, Elyria, Ohio

Application November 6, 1931. Serial No. 573,509

12 Claims. (Cl. 15—104.09)

This invention relating as indicated to means for cleaning conduits and stringing cables therethrough has more specific reference to the construction of a self-propelled means adapted to work its way under its own motive power through an underground conduit such as employed to house electric cables and the like so that the device, in its passage through the conduit, will clean the same from objectionable foreign material and also be able to function as a device for threading a line through the conduit which may be later employed for the purpose of pulling the cable.

As is well known to those familiar with the art, considerable difficulty has been experienced in the maintenance of underground conduits in that earth and other foreign material usually finds its way into the relatively narrow confines of the conduit so that after the same has been installed for an appreciable length of time, either with or without the cable, it is necessary that the same be thoroughly cleaned before a new cable can be laid.

It is among the objects of my invention to provide a device which is capable of working its way through the narrow confines of an underground conduit for cables loosening all or substantially all of the foreign material adhering to the sides of the conduit and at the same time flushing out such conduit so that the same may readily receive the cable later to be drawn therethrough. Other objects of my invention will appear as the description proceeds.

To the accomplishment of the foregoing and related ends, said invention, then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 7:
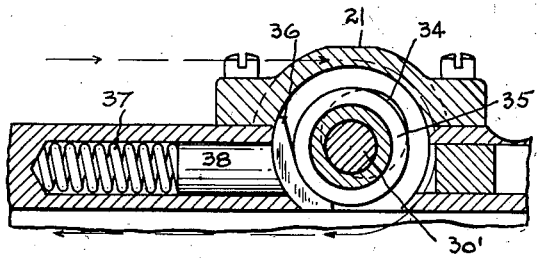
Figure 6:
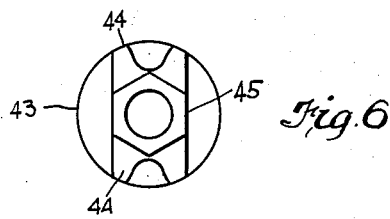
Figure 8:
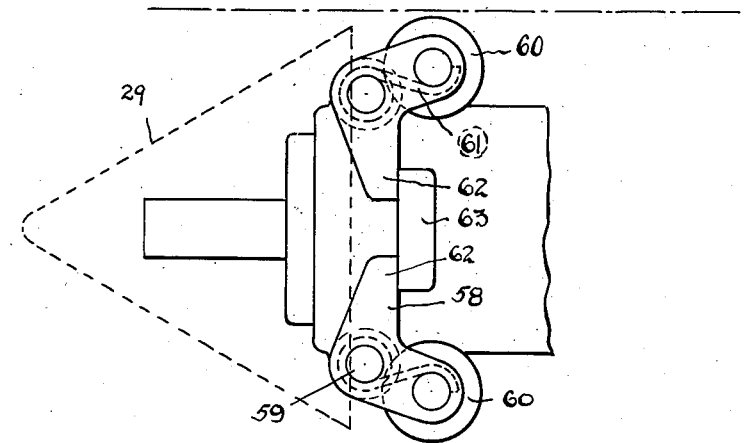

In said annexed drawings:

Fig. 1 is a part side elevational, part sectional view of a portion of the apparatus comprising my invention; Fig. 1a is a part side elevational, part sectional view of the supplementary portion of the device comprising my invention; Fig. 2 is a transverse sectional view through a portion of the apparatus illustrated in Fig. 1, taken on a plane substantially indicated by the line 2—2; Fig. 3 is a transverse sectional view of the apparatus illustrated in Fig. 1, taken on a plane substantially indicated by the line 3—3; Fig. 4 is a fragmentary plan view of a portion of the apparatus illustrated in Fig. 1; Fig. 5 is a fragmentary, part sectional, part elevational view of a portion of the apparatus illustrated in Fig. 4, taken on planes substantially indicated by the lines 5—5; Fig. 6 is a side elevational view of one of the sprockets about which the endless tread chains disclosed in the previous figures are trained; Fig. 7 is a fragmentary sectional view of an alternative form of construction for the supporting means for the shaft on which is mounted the idler pinion about which the endless tread chains are trained; and Fig. 8 is a fragmentary plan view of the forward portion of the device comprising my invention.

Referring now more specifically to the drawings and more especially to Figs. 1 and 1a, it should be noted that the apparatus disclosed in these figures is designed to be connected in a train so that the apparatus illustrated in Fig. 1 may be propelled and driven in the manner hereinafter more fully explained by the apparatus most clearly illustrated in Fig. 1a.

That portion of the apparatus which may be termed its power plant is most clearly illustrated in Fig. 1a and for purposes of convenience will first be described.

This apparatus consists of a housing generally indicated at 1 which is preferably formed in several pieces generaly indicated at 2, 3 and 4. The central portion 3 houses an electric motor generally indicated at 5 which is of special design and having the required torque speed characteristics for efficiently performing the work which it is required to do in this installation. The armature shaft of the motor 5 is preferably journaled in suitable friction reducing bearings 6 and 7 arranged in the juxtaposed ends of the housing members 2 and 4 so that all of the operating parts are properly and rigidly supported. The housing member 2 extends rearwardly and is provided with an internally threaded extension 7a adapted to removably receive a securing ring 8 which, cooperating with a tubular forward extension 9 thereof and a threadably secured collar 10, supports a block of insulating material 12 removably within the end of the housing 2. The block of insulating material 12 is normally in abutting relation with a similar block of like material 13 and the two blocks are, as indicated in rather diagrammatic form in Fig. 1a, provided with suitable electrical contact devices whereby the circuit from main leads such as those generally indicated at 14 and which pass out through the confining conduit 65 may be completed to the motor 5.

This separable connection for the contacts is very essential for the reason that after the device presently to be described has passed through the longitudinal extent of the conduit, it is very convenient to uncouple the electric leads thereto and then simply withdraw the electric leads through the conduit rather than reversing the entire mechanism.

Mounted in the forward housing 4 is a train of reduction gearing generally indicated at 15 which may be of any suitable form so as to effect the proper speed reduction between the armature shaft of the motor 5 and a rotatable driving collar 16. The exact form of this gear reduction mechanism forms no part of my invention and accordingly will not be described in further detail. Suffice it to say that the proper reduction must be effected here so that the small-size motor limited by the cross-sectional area of the conduit may develop sufficient torque to adequately propel the device.

The block 16, as most clearly illustrated at the left of Fig. 1a and at the right of Fig. 1, is provided with an axially extending recess in which is secured the terminal 17 of a coil spring 18 which, at its other terminal 19, is secured in a driven collar 20 keyed to a shaft 21.

The spring 18 drivably connecting the collars 16 and 20 affords a very effective universal coupling so that there may be relative angular displacement between the axes of the working and the driving portions of the tool without interfering with the operation of the device. It is to be noted, however, that any efficient type of universal joint may be employed for the purpose of connecting the driving and operating portions of the device. This enables the conduit cleaner comprising my construction to be relatively long and at the same time permits the same to pass around curves in the conduit as is frequently the case.

The construction of the working or forward portion of my apparatus as most clearly illustrated in Fig. 1 will now be described.

The forward or operating portion of my apparatus consists of a housing member, generally indicated at 22, which offers a suitable support for a friction reducing bearing 23 supporting the rear end of the shaft 21. The casing 22 extends forwardly and at its forward extension has bearing caps 23' removably secured thereto by means such as bolts 24. Within the confines of this forward extension of the casing are friction reducing bearings 25 radially supporting the forward end of the shaft 21 and friction reducing bearings 26 taking the axial thrust of such shaft. Bearings 25 and 26 are maintained in removable relation by means of a removable collar 27 threadably secured to the inner periphery of the forward extension of the housing member 22.

Mounted on the forward extension of the shaft 21 and preferably removably secured thereto is a reaming tool generally indicated at 28 which is preferably conical in form and provided with axially convergent ribs 29 which function to cut away the foreign material which may be lodged on the inner periphery of the conduit through which the device later passes.

The form of the terminals of the housing, previously generally indicated at 22, is most clearly illustrated in Fig. 2, although this view shows more specifically a transverse section of the forward end of such housing. Regardless, however, as to which end is considered, the housing 22 may be at the terminals substantially rectangular in form and have supported therein in suitable bearings shafts 30 to the terminals of which are secured sprockets, the form of which appears most clearly in Fig. 6.

Keyed or otherwise suitably secured to the shafts 30 are worm gears 31 and 32 which mesh with a worm 33 formed on or secured to and rotatable with the shaft 21. Rotation of the shaft will, therefore, effect rotation of the cross shafts 30 in opposite directions. The form of construction of the rear sprockets about which the tread chains are trained is preferably identical with the front sprockets and the shafts which support such sprockets may be the same as shafts 30, although since these sprockets are idlers, no gears such as 31 need be employed and accordingly, no worm such as 33 is provided on the rear portion of the shaft 21.

In order to compensate for varying lengths in the tread chains presently to be described as they are initially installed or to take up any wear which occurs therein during use, I may prefer to provide an automatic take-up for the rear idlers in the form most clearly illustrated in Fig. 7. In this figure, the housing 21 is provided with a suitable aperture generally indicated at 34 into which the shafts 30' extend. The shafts 30' have a bearing collar 35 secured thereto which are adapted to engage and run in contact with a cam-shaped supporting block 36.

The block 36 is urged towards the rear of the device and the chain accordingly tensioned by means of a compression spring 37 acting on a suitable plunger 38 which is either in contact with or formed integrally with the bearing block 36. At this point, it may be well to note that the inclination of the operating face of the member 36 causes the shaft 30' to be urged not only rearwardly but also outwardly from the body of the device so that the chains are resiliently forced into contact with the sides of the conduit through which the device passes.

The construction on the tread chains which support the device and contacting with the walls of the conduit propel the same are most clearly illustrated in Fig. 4. Such tread chains consist generally of side bars or link members comprising outer members 39 and inner links 40 which are laterally spaced as is common practice in chain construction and interconnected by means of pins on some of which pins are mounted rollers 41. On the transverse pins of the chain intermediately of those which carry the rollers 41 are secured contact blocks 42 which may be of any suitable material but which, if made of rubber, it will be found have better traction with the side of the conduit than if metal pads are employed.

As previously indicated, the tread chains of the device are trained about sheaves 43 which are secured to the terminals of the transverse driven shafts 30 and the idler shafts 30'. As most clearly illustrated in Figs. 2 and 6, the sprockets are of the two-tooth variety, namely, provided with diametrical opposed portions generally indicated at 44 which have radially extending recesses adapted to receive the rollers 41 of the chain and as the sheaves are rotated, cause the proper movement of the chain. The side faces 45 of this two-tooth sprocket serve as an abutment against which the under faces of the pads 42 may rest as the chain moves about the sprocket. Secured to and preferably formed integrally with the sprockets 45 are side guard members 46 which are effective to prevent the chain from rubbing directly against the side of the conduit and also to prevent lumps of foreign material working their way between the chain and sprocket which would normally cause the chain to run off from the sprockets.

The portions of the casing 22 intermediately of its terminal portions which carry the transverse shafts 30 and 30' are, as most clearly illustrated in Fig. 3, provided with radially extending abutment members 87 in which are supported, as most clearly illustrated in Figs. 4 and 5, relatively short transverse shafts 48. Looped about the shafts 48 are spaced spring members 49 which extend on opposite sides of the shafts 48, are at one end looped, as at 50, about floating shafts 51 and at their other end, looped about cap screws 53 which are adjustably supported in threaded holes provided therefor in the abutments 87. Adjustment of the screws 53 will accordingly adjust the tension of the springs 49 and vary the amount by which such springs urge the floating shafts 51 upwardly and away from the abutments 47. As most clearly illustrated in Fig. 5 the abutments 47 intermediately of the areas of support for the transverse shafts 48 may be recessed to permit free movement of the floating shafts 51.

The floating shafts 51 have mounted on their outer ends, spools 54 the form of which is most clearly illustrated in Fig. 3. The spools 54 have a central portion adapted to engage the underside of the chain and flanged terminal portions 55 which maintain the chain in proper alignment on the device. The floating shafts 51 being resiliently mounted by means of the aforementioned springs 49 are accordingly urged outwardly and therefore press the track against the inner faces of the adjacent walls of the conduit so that uniform traction throughout the entire length of the traction chains is insured.

The forward or operating end of the device comprising my invention is, therefore, in intimate contact with the opposite sides or walls of the conduit and in this connection, it should be noted that for certain types of work, I may prefer to employ only one traction chain instead of two such as are illustrated in Fig. 1 and then again, it may be advisable, for certain types of work, to provide chains which contact with all sides of the conduit. The rear end of the so-called power plant portion of the device may be supported from coming in contact with the side of the conduit and accordingly dragging thereon by means of suitable wheels such as 56 which will be supported in a suitable fashion on brackets 57 extending rearwardly from the casing 2.

Fig. 8 shows a fragmentary plan view of the forward portion of the operating unit of the device and more specifically illustrates means for maintaining such device substantially in the center of the conduit through which it passes. These means consist of brackets 58 oscillatably supported on stub shafts 59 and terminally carrying rollers 60. The rollers carried by the arms are normally urged outwardly by means of springs such as 61, such movement being limited by the inner ends 62 of the arms 58 coming in contact with an abutment 63. As the device moves through the conduit, the resiliently supported wheels 60 will maintain the tool at the approximate center of the conduit, sufficient clearance, however, being provided on each side to permit a slight hunting action which is necessary for the free movement of the device through the restricted opening.

From the foregoing description it is believed that the operation of the apparatus comprising my invention is sufficiently evident without requiring a repetition of the manner in which several parts function.

It may be well to briefly state that the device comprising my invention is introduced into one end of a suitable conduit and propelled therethrough under its own power, cleaning the conduit, or at least loosening all foreign material adhering to the sides of the conduit, so that the loosened material may be readily flushed out. After the device has passed through the conduit, the ring 8 will be removed from the rear end 7 of the casing 2 and the electric cable pulled back out of the conduit which can be accomplished very easily, inasmuch as the diameter of this part is much less than the inside dimensions of the conduit.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device of the character described, the combination of a self-propelled vehicle having endless flexible tracks arranged to engage the walls of said conduit, and a material dislodging tool carried by and projecting forwardly of said vehicle.

2. In a device of the character described, the combination of a self-propelled vehicle having endless flexible tracks arranged to engage opposite walls of said conduit and a power driven rotatable material dislodging tool carried by and projecting forwardly of said vehicle.

3. In a device of the character described, the combination of a frame member, a shaft journaled longitudinally in said frame, paired transverse shafts arranged on opposite sides of said longitudinal shaft, gearing means connecting said longitudinal shaft and one pair of said transverse shafts, sprockets on said shafts, crawler tread chains trained about said sprockets, and means resiliently urging one pair of said transverse shafts outwardly.

4. In a device of the character described, the combination of a frame member, a shaft journaled longitudinally in said frame, paired transverse shafts arranged on opposite sides of said longitudinal shaft, gearing means connecting said longitudinal shaft and one pair of said transverse shafts, sprockets on said shafts, crawler tread chains trained about said sprockets, means resiliently urging one pair of said transverse shafts outwardly and in such fashion as to tighten said tread chains.

5. In a device of the character described, the combination of a frame member, a shaft journaled longitudinally in said frame, paired transverse shafts arranged on opposite sides of said longitudinal shaft, gearing means connecting said longitudinal shaft and one pair of said transverse shafts, sprockets on said shafts, crawler tread chains trained about said sprockets, and means intermediately of said transverse shafts resiliently supporting the operating run of said tracks.

6. In a device of the character described, the combination of a frame member, a shaft journaled longitudinally in said frame, paired transverse shafts arranged on opposite sides of said longitudinal shaft, gearing means connecting said longitudinal shaft and one pair of said transverse shafts, sprockets on said shafts, crawler tread chains trained about said sprockets, a plurality of resiliently supported transverse shafts intermediate said first named transverse shafts, sheaves on said resiliently supported shafts engaging the operating run of said tracks, and guard means on the outer ends of said sheaves.

7. In a device of the character described, the combination of a frame member, a shaft journaled longitudinally in said frame and projecting forwardly therefrom, a material dislodging tool on the forward extension of said shaft, paired transverse shafts arranged on opposite sides of said longitudinal shaft, gearing means connecting said longitudinal shaft and one pair of said transverse shafts, sprockets on said shafts, and crawler tread chains trained about said sprockets.

8. In a device of the character described, the combination of an endless track, means for supporting said track, and resilient means urging said supporting means outwardly into tractional engagement with the surface to be traversed.

9. In a self-propelled vehicle of the character described, the combination of a frame, a movable sprocket carrying shaft mounted in said frame, an endless track carried by said sprocket and resilient means contacting with said shaft and adapted to urge the latter outwardly from said frame.

10. In a self-propelled vehicle of the character described, the combination of a frame, a rotatable axle movably mounted therein, an endless track carried by said shaft for engagement against a surface on which said vehicle is to be propelled, means normally supporting said axle and track in a given position in said frame, said means and said axle being jointly responsive to variation in the tractive resistance to movement of said vehicle to correspondingly vary the position of said axle and track with respect to said frame, and thereby vary the pressure between said track and the surface engaged thereby.

11. In a self-propelled vehicle of the character described, the combination of a frame, a rotatable axle movably mounted therein, an endless track carried by said shaft for engagement against a surface on which said vehicle is to be propelled, and resilient resistance means normally supporting said axle and track in a given position in said frame, said means and said axle being jointly responsive to variation in the tractive resistance to movement of said vehicle to correspondingly vary the position of said axle and track with respect to said frame, and thereby vary the pressure between said track and the surface engaged thereby.

12. In a self-propelled vehicle of the character described, the combination of a frame, a rotatable axle movably mounted therein, an endless track carried by said shaft for engagement against a surface on which said vehicle is to be propelled, and a resiliently actuated cam mounting for said axle, said axle and cam being jointly responsive to variation in the tractive resistance to movement of said vehicle to correspondingly vary the position of said axle and track, and to thereby vary the pressure exerted by said track against the surface engaged thereby.

JAMES GUTHRIE.